Feb. 19, 1935.  J. W. DIEDERICH  1,991,549

AUXILIARY SPRING

Filed Jan. 22, 1934

Inventor
John W. Diederich
By Blackmore, Spencer & Flint
Attorneys

Patented Feb. 19, 1935

1,991,549

UNITED STATES PATENT OFFICE 1,991,549

AUXILIARY SPRING

John W. Diederich, Detroit, Mich., assignor to General Motors Corporation, Detroit, Mich., a corporation of Delaware Application January 22, 1934, Serial No. 707,658

6 Claims. (Cl. 267—45)

Motor truck operators who are in the habit of hauling loads that are too heavy for the factory equipped springs on their vehicles, sometimes build up spring resistance by adding several leaves or else substituting stronger springs. While maximum loading is taken care of in this manner, a rough ride is had when the vehicle is lightly loaded.

For utmost comfort and a smooth ride throughout the load range, the practice has been followed at times of retaining the standard springs and adding auxiliary or helper springs which are inactive when a light load is carried, but which come into play to assist the main springs when the load is heavy and the main springs undergo a given deflection. The installation of such helper springs has involved at considerable expense complete disassembly of the standard spring and the substitution of longer clamp bolts to hold the auxiliary spring pack on top of the main spring and the two springs on the axle.

An object of the present invention is to provide as regular equipment, but at no extra cost, an improved spring suspension which can be easily and quickly modified by the addition of helper springs without disturbing the original assembly of parts or requiring special tools and skill. Such auxiliary springs may be stocked and sold as accessory parts through the regular service channels and installed at any time during the life of the truck. For this purpose there is contemplated a spring pad which engages with the top of the main spring, with seats to receive clamp bolts that draw together the pad and axle and secure the spring pack therebetween, and which has an additional spring seating surface and clamp bolt engaging portions for optionally mounting thereon by supplementary clamp bolts an auxiliary or helper spring assembly.

Figure 1:
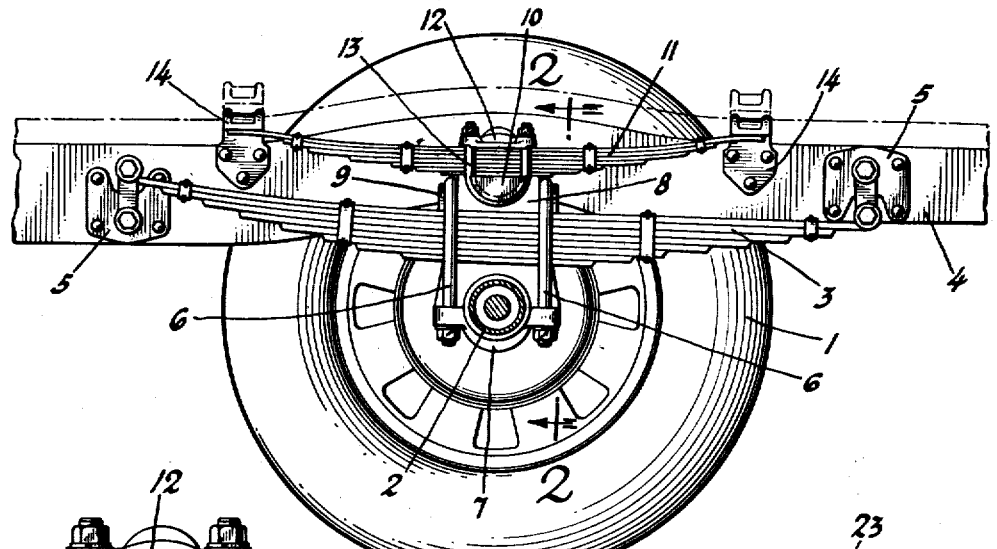
Figure 2:
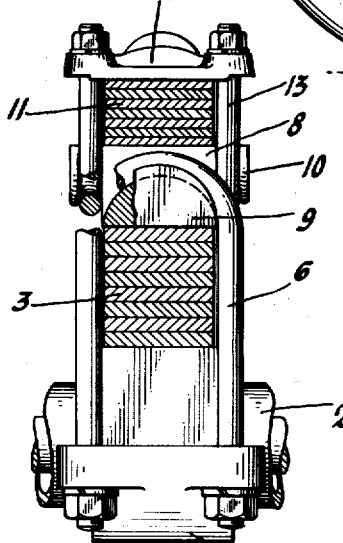
Figure 3:
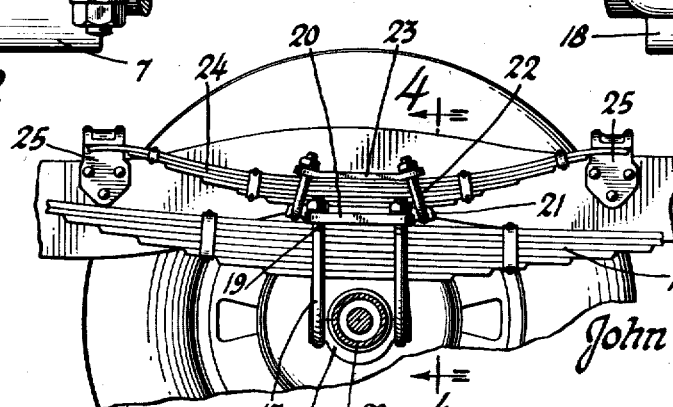

The invention will be better understood upon reference to the accompanying drawing, wherein Figure 1 is a side elevation of a chassis frame suspended upon an axle with one wheel removed and the axle shown in section; Figure 2 is a transverse section taken on line 2—2 of Figure 1; Figure 3 is a side elevation showing a modified spring assembly, and Figure 4 is a section taken on line 4—4 of Figure 3.

Referring to the drawing, the numeral 1 indicates a road wheel supported upon the end of the axle 2, which resiliently suspends the opposite sides of the vehicle chassis frame. The suspension at each side involves a main load supporting spring 3 of the multiple leaf type, extending longitudinally of the frame side member 4 and secured thereto at opposite ends through spaced brackets 5 with an intermediate portion clamped to the axle 2. In the present case the spring and axle connection involves a pair of straddle or U-bolts 6 extending beside the spring assembly 3 and engaging at opposite ends with a split axle block 7 and a spring pad 8. This spring pad may comprise a forging or casting having substantially flap top and bottom spring seating surfaces with reduced portions 9 at opposite ends, in each of which is provided a transversely extending curved recess to receive the connecting portion of one of the U-bolts 6 by which the pad is drawn toward the axle block 7 to secure the main load supporting spring in place. Laterally projecting bosses 10 are also provided on each side of the pad 8, and have formed therein longitudinally extending curved seats which are adapted to receive clamp bolts forming a part of the accessory helper spring assembly. Thus the owner of a truck provided with the spring suspension thus far described may at any time, and without disturbing the assembly of the spring, convert his truck by mounting on the upper spring seat engaging portion of the pad 8 an auxiliary leaf spring, such as indicated at 11 in the drawing, and secure the same in place through a clamp plate 12 and a pair of supplementary U-bolts 13, the closed ends of which can be easily and quickly fitted to the seats in the extension lugs 10. Sliding bearing surfaces for the opposite ends of the auxiliary spring may be provided by a pair of angular brackets 14 riveted or otherwise secured to the chassis side member 4, so as to engage with the auxiliary spring 11 when the frame is heavily loaded and transmit a portion of the load through the spring and directly to the axle 2. In order to give a better ride for light loads, the frame brackets 14 are so located as to move out of engagement with the helper spring 11, as indicated by the broken line position of the parts in Figure 1, so that the entire load will be carried by the main spring.

Figure 4:
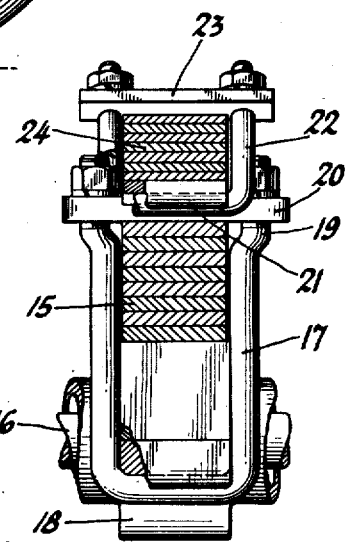

An alternative embodiment of the invention is illustrated in Figures 3 and 4, where the main spring 15 is clamped to the axle 16 by a pair of U-bolts 17 embracing an axle block 18 and extending upwardly beside the spring pack 15 with offset threaded ends 19 that pass through lateral extensions on the spring pad 20 and are secured in place by suitable fastening nuts or the like. The plate 20 is also provided with end lugs or extensions 21 which are transversely recessed to receive straddle bolts 22, which cooperate with a clamping plate 23 to secure the auxiliary or helper spring 24 against the top face of the pad 20. Frame brackets 25 provide bearings for the opposite ends of the auxiliary spring and the application and the action of the helper spring in this case are substantially as heretofore described.

I claim:

1. In a road vehicle, a chassis frame and an axle, a main load supporting spring having connections at opposite ends with the frame, a helper spring, bearings carried by the frame for engagement with opposite ends of the helper spring after a given deflection of the main spring, a pad interposed between said springs and provided with substantially flat top and bottom surfaces for engagement with the bottom of the helper spring and the top of the main spring respectively, means for rigidly clamping the main spring between the axle and said pad and separate means offset from and lying in different planes from the planes in which the first mentioned rigid clamping means lie engaging the pad to rigidly clamp the helper spring on the pad.

2. In a duplex spring arrangement, a pair of superposed multiple leaf springs, a pad interposed between said springs and provided with a plurality of clamp bolt engaging portions, U-bolts extending beside one of said springs and engaging two of said portions for clamping the spring and pad together, and a second pair of U-bolts extending around the other spring and engaging other portions for independently clamping together the pad and said other spring.

3. In combination with a chassis frame and an axle, of a main load supporting spring connected at opposite ends to the frame, a helper spring adapted for engagement at opposite ends with frame bearings after a given deflection of the main spring, a spring pad between said springs having a pair of transversely disposed U-bolt seats and a pair of longitudinally disposed U-bolt seats, a pair of U-bolts engaging one pair of seats for clamping one spring rigidly to the pad and a second pair of U-bolts engaging the other pair of seats and rigidly clamping the other spring to the pad.

4. The combination with an axle and a frame, of a main load supporting spring connected at opposite ends to the frame, a spring pad engaging an intermediate portion of the spring, attachment bolts connecting the spring pad and axle and rigidly clamping said spring therebetween, a seating surface on said pad for engagement with an auxiliary spring and seating portions integral with the pad to receive additional U-bolts for clamping to said seating surface an auxiliary spring.

5. An accessory for use with a main spring suspension having the ends secured to a frame by shackles and its center portion secured to an axle by U-bolts comprising a spacing and securing member composed of two half cylinder members at right angles, the rounded portions of which merge together, the flat portions forming the top and bottom surfaces thereof, the lower half cylinder having its axis running parallel with the main spring and its half round ends secured under the main U-bolts whereby a flat top surface and a pair of half round ears in a different plane are supplied so that auxiliary apparatus may be attached without disturbing the existing structure.

6. An accessory for use with a main spring suspension having the ends secured to a frame by shackles and its center portion secured to an axle by U-bolts comprising a spacing and securing member composed of a flat rectangular plate, a hole in each corner of the plate for the reception of the main U-bolts to hold the plate on top of the main spring, offset ears extending from two ends whereby auxiliary apparatus may be attached to the top without disturbing the existing structure.

JOHN W. DIEDERICH.